US 9,024,266 B2

(12) United States Patent
Menge

(10) Patent No.: US 9,024,266 B2
(45) Date of Patent: May 5, 2015

(54) RADIATION DETECTION SYSTEM INCLUDING A SCINTILLATING MATERIAL AND AN OPTICAL FIBER

(71) Applicant: Saint-Gobain Ceramics & Plastics, Inc., Worcester, MA (US)

(72) Inventor: Peter R. Menge, Novelty, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 14/109,152

(22) Filed: Dec. 17, 2013

(65) Prior Publication Data

US 2014/0103227 A1    Apr. 17, 2014

Related U.S. Application Data

(63) Continuation of application No. 13/162,292, filed on Jun. 16, 2011, now Pat. No. 8,637,826.

(60) Provisional application No. 61/356,352, filed on Jun. 18, 2010.

(51) Int. Cl.
*G01T 1/20* (2006.01)
*G01T 3/06* (2006.01)

(52) U.S. Cl.
CPC .............. *G01T 1/2002* (2013.01); *G01T 1/20* (2013.01); *G01T 3/06* (2013.01)

(58) Field of Classification Search
CPC .......... G01T 1/202; G01T 1/20; G01T 1/2002
USPC ...................................................... 250/486.1
See application file for complete search history.

(56) References Cited

U.S. PATENT DOCUMENTS

| 4,131,160 A | 12/1978 | Cochran |
| 4,158,773 A | 6/1979 | Novak |

(Continued)

FOREIGN PATENT DOCUMENTS

| EP | 0402035 A1 | 12/1990 |
| JP | 2000300546 A | 10/2000 |

(Continued)

OTHER PUBLICATIONS

GE Energy, Scinturion Gamma Modules for Ryan Energy MWD Systems, Case Study, www.ge-energy.com/oilfield; Dec. 2008, 2 pages.

(Continued)

*Primary Examiner* — Marcus Taningco
(74) *Attorney, Agent, or Firm* — Abel Law Group, LLP; Robert N. Young

(57) ABSTRACT

A radiation detection system can include optical fibers and a material disposed between the optical fibers. In an embodiment, the material can include a fluid, such as a gas, a liquid, or a non-Newtonian fluid. In another embodiment, the material can include an optical coupling material. In a particular embodiment, the optical coupling material can include a silicone rubber. In still another embodiment, the optical coupling material has a refractive index less than 1.50. In still another embodiment, the radiation detection system can have a greater signal:noise ratio, a light collection efficiency, or both as compared to a conventional radiation detection system. Corresponding methods of use are disclosed that can provide better discrimination between neutrons and gamma radiation.

20 Claims, 4 Drawing Sheets

(56) References Cited

U.S. PATENT DOCUMENTS

| | | | |
|---|---|---|---|
| 4,383,175 A | 5/1983 | Toepke | |
| 4,727,592 A | 2/1988 | Okada et al. | |
| 4,764,677 A | 8/1988 | Spurney | |
| 4,829,185 A | 5/1989 | Cerff | |
| 4,994,673 A | 2/1991 | Perna et al. | |
| 5,047,635 A | 9/1991 | Leaney et al. | |
| 5,087,818 A | 2/1992 | Bellian et al. | |
| 5,103,099 A | 4/1992 | Bourdinaud et al. | |
| 5,120,963 A | 6/1992 | Robinson et al. | |
| 5,283,439 A | 2/1994 | Bouissou et al. | |
| 5,548,116 A | 8/1996 | Pandelisev | |
| 5,636,299 A | 6/1997 | Bueno et al. | |
| 5,684,907 A | 11/1997 | Sprehn et al. | |
| 5,742,057 A | 4/1998 | Frederick et al. | |
| 5,783,829 A | 7/1998 | Sealock et al. | |
| 5,796,109 A | 8/1998 | Frederick et al. | |
| 5,869,836 A | 2/1999 | Linden et al. | |
| 5,962,855 A | 10/1999 | Frederick et al. | |
| 6,078,052 A | 6/2000 | DiFillippo | |
| 6,355,932 B1 | 3/2002 | Frederick | |
| 6,465,788 B1 | 10/2002 | Medley | |
| 7,034,305 B2 | 4/2006 | Frederick et al. | |
| 7,154,098 B2 | 12/2006 | Clarke et al. | |
| 7,170,061 B2 | 1/2007 | Clarke et al. | |
| 7,189,972 B2 | 3/2007 | Ertel et al. | |
| 7,326,933 B2 | 2/2008 | Katagiri et al. | |
| 7,573,035 B2 | 8/2009 | Levene et al. | |
| 7,828,068 B2 | 11/2010 | Gano et al. | |
| 2002/0113352 A1 | 8/2002 | Edwards | |
| 2008/0093557 A1 | 4/2008 | Cooke et al. | |
| 2009/0014662 A1 | 1/2009 | Suhami | |
| 2009/0020705 A1 | 1/2009 | Pandelisev | |
| 2009/0261263 A1 | 10/2009 | Menge et al. | |
| 2010/0032577 A1 | 2/2010 | Fruehauf et al. | |
| 2010/0193690 A1 | 8/2010 | Hunt | |
| 2010/0224783 A1 | 9/2010 | Frank | |
| 2010/0243877 A1 | 9/2010 | Berheide et al. | |
| 2010/0294415 A1 | 11/2010 | Frank | |
| 2011/0079726 A1 | 4/2011 | Kusner et al. | |
| 2011/0309257 A1 | 12/2011 | Menge | |
| 2012/0043458 A1 | 2/2012 | Herr et al. | |

FOREIGN PATENT DOCUMENTS

| | | |
|---|---|---|
| WO | 2011159911 A2 | 12/2011 |
| WO | 2012024359 A2 | 2/2012 |

OTHER PUBLICATIONS

The International Search Report and the Written Opinion for International Application No. PCT/US2011/048023 received from the International Searching Authority (ISA/KR), dated Mar. 14, 2012, 10 pages.

U.S. Appl. No. 61/374,399, filed Aug. 17, 2010, Inventors: Daniel J. Herr, et al.

U.S. Appl. No. 13/211,383, filed Aug. 17, 2011, Inventors: Daniel J. Herr, et al.

The International Search Report and the Written Opinion for International Application No. PCT/US2011/040719 received from the International Searching Authority (ISA/KR), dated Feb. 20, 2012, 8 pages.

Andrew C. Stephan et al. "Neutronics aspects of position-sensitive neutron scintillator detectors using wavelength-shifting readout fibers," Applied Radiation and Isotopes 61 (Apr. 2004) pp. 1375-1382.

Donald P. Hutchinson et al., "Position Sensitive Scintillation Neutron Detectors using a Crossed-Fiber Optic Readout Array," SPIE, Proceedings vol. 3769, Oct. 1, 1999, 4 pages.

US 9,024,266 B2

RADIATION DETECTION SYSTEM INCLUDING A SCINTILLATING MATERIAL AND AN OPTICAL FIBER

CROSS-REFERENCE TO RELATED APPLICATION

This application is a continuation of and claims priority under 35 U.S.C. §120 to U.S. patent application Ser. No. 13/162,292 entitled "Radiation Detection System Including a Scintillating Material and an Optical Fiber and Method of Using the Same," by Menge, filed Jun. 16, 2011, which claims priority under 35 U.S.C. §119(e) to U.S. Patent Application No. 61/356,352 entitled "Radiation Detection System Including a Scintillating Material and an Optical Fiber and Method of Using the Same," by Menge, filed Jun. 18, 2010, both of which are assigned to the current assignee hereof and incorporated herein by reference in their entireties.

FIELD OF THE DISCLOSURE

The present disclosure is directed to radiation detection systems including scintillating materials and optical fibers and methods of using the same.

BACKGROUND

Radiation detection systems are used in a variety of applications. For example, scintillators in the radiation detection systems can be used to detect neutrons and gamma radiation. Such radiation detection systems are used by security agencies to detect radioactive or other hazardous materials, particularly at national borders, airports, and shipping docks.

FIG. 1 includes an illustration of a cross-sectional view of a conventional radiation detection system 10 that includes a scintillating material 12 that produces scintillating light in response to thermal neutrons. The scintillating material 12 includes $^6$LiF and ZnS:Ag particles within a polymer matrix. Thermal neutrons cause the scintillating material to emit light that is received by wavelength shifting fibers 14. The wavelength shifting fibers 14 include a polystyrene core 144 surrounded by a poly(methyl methacrylate) cladding 142. Epoxy 16 is an optical coupling material that lies between the scintillating material 12 and the wavelength shifting fibers 14 and between the fibers 14 themselves. Blue light is emitted by the scintillating material 12 that is shifted to green light by the wavelength shifting fibers 14. A relatively low fraction of the green light is received by one or more photomultiplier tubes (not illustrated).

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
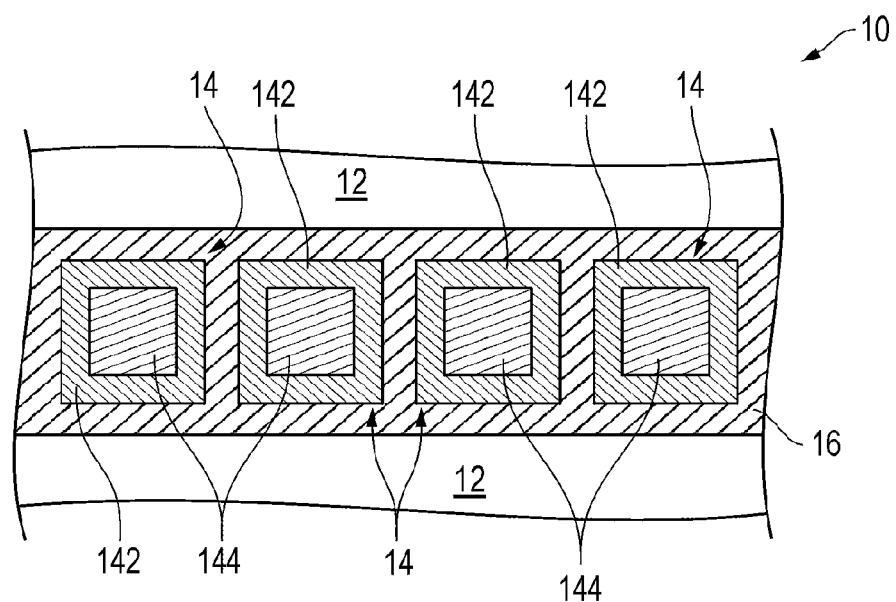
FIG. 1 includes an illustration of a cross-sectional view of a portion of a conventional radiation detection system. (Prior art)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. While numerical ranges are described herein to provide a better understanding of particular embodiments, after reading this specification, skilled artisans will appreciate that values outside the numerical ranges may be used without departing from the scope of the present invention.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read such that the plurals include one or at least one and the singular also includes the plural, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillating and radiation detection arts.

As will be described herein, radiation detection systems can be designed and fabricated to improve signal:noise ratio as compared to conventional radiation detection systems, such as the radiation detection system that is partially illustrated in FIG. 1. Particular embodiments can reduce photon transmission loss for S-shaped bends, improve light collection uniformity between optical fibers, improve light collection efficiency of optical fibers, or any combination of these properties. The particular embodiments are described in more detail below and are used to illustrate some embodiments. After reading this specification, skilled artisans will appreciate that other embodiments can be used without departing from concepts as described herein.

Figure 2:
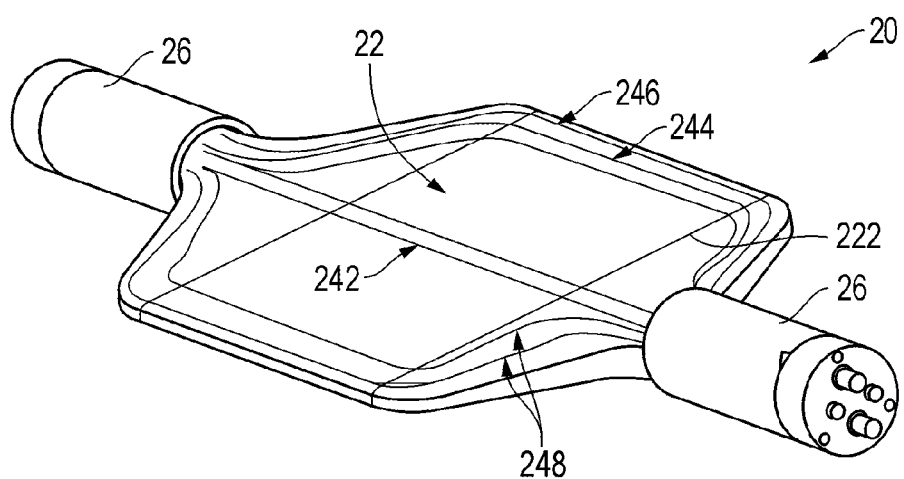
FIG. 2 includes an illustration of a perspective view of a portion of a radiation detection system in accordance with an embodiment described herein.

FIG. 2 includes an illustration of a perspective view of a portion of a radiation detection system 20 that includes a scintillating material 22, optical fibers, such as optical fibers 242, 244, and 246, and photosensor modules 26. The scintillating material 22 can be configured to produce scintillating light in response to receiving a target radiation, such as a neutron, gamma radiation, other target radiation, or any combination thereof. The scintillating light produced by the scintillation material 22 can include visible light or other radiation (such as ultraviolet radiation). The optical fibers are optically coupled to the scintillating material 22. In the embodiment as illustrated, the optical fibers receive scintillating light from the scintillating material 22 and transmit such light or wavelength-shifted light to the photosensor modules 26. In a particular embodiment, the scintillating light is blue, and the optical fibers shift the wavelength such that green light is received by the photosensor modules 26. Although not illustrated, the radiation detection system 20 can include a microprocessor, a microcontroller, or other electronic components that receive and process electrical pulses or other signals generated by the photosensor modules 26.

The radiation detection system 20 has a principal sensing area 222 that corresponds to the shape of the scintillating material. In the embodiment as illustrated in FIG. 2, the principle sensing area 222 has a quadrilateral shape. In a particular embodiment, the shape can be a square or other rectangle, a diamond, a trapezoid, or the like. In another embodiment, the principal sensing area 222 can have a different shape, such as a circle, an oval, a triangle, a pentagon, a hexagon, or the like. In still another embodiment, the principal sensing area 222 may have an irregular shape.

In the embodiment illustrated in FIG. 2, the scintillation material 22 can include a plurality of components. For example, the scintillation material 22 can include a neutron sensing particulate material, such as $^3$He, $^6$Li, or $^{10}$B (in ionized or non-ionized form). In an embodiment, the $^3$He can be entrained or dissolved within a solid material. Upon receiving a thermal neutron, the neutron sensing particulate material can produce a secondary particle, such as an alpha particle and triton particle, in response to receiving the thermal neutron. In an embodiment, the secondary particle can include a positively charged particle, such as an alpha particle ($^4$He nucleus), a triton particle ($^3$H nucleus), a deuteron particle ($^2$H nucleus), a $^7$Li nucleus, or any combination thereof. The scintillation material 22 can also include a scintillating particulate material, such as ZnS, CaWO$_4$, Y$_2$SiO$_5$, ZnO, ZnCdS, CaF$_2$, yttrium aluminum garnet ("YAG"), yttrium aluminum perovskite ("YAP"), bismuth germanate ("BGO"), gadolinium oxyorthosilicate ("GSO"), or another substance to produce photons in response to receiving secondary particles.

In a particular embodiment, the scintillating particulate material may have a low sensitivity to gamma radiation. As used herein, sensitivity refers to the absorption efficiency of the target radiation. As such, a scintillating particulate material with low sensitivity to gamma photons has a low absorption efficiency for gamma radiation. In the particular embodiment, the scintillating particulate material can have a gamma ray attenuation length of at least approximately 2.34 cm at 662 keV. Thus, the scintillating material 22 can detect neutrons without generating a significant amount of noise due to gamma radiation. Utilizing only elements having a low atomic number, such as below 50, even below 40, can reduce the sensitivity to gamma photons. For example, the scintillating particulate material 22 can incorporate a ZnS, a ZnO, a ZnCdS, a YAG, a YAP, a CaF$_2$, or any combination thereof. Additionally, the scintillating particulate material 22 can include a dopant, such as a transition metal, a rare earth metal, or another metal. For example, the scintillation particulate material 22 can include ZnS:Ag, ZnS:Cu, ZnS:Ti, Y$_2$SiO$_5$:Ce, ZnO:Ga, or ZnCdS:Cu.

In an embodiment, the neutron sensing particulate material and a scintillating particulate material can be dispersed within a polymer matrix. The polymer matrix can include poly(vinyl toluene) ("PVT"), a polystyrene ("PS"), a poly(methyl methacrylate) ("PMMA"), or any combination thereof. The scintillation material 22 can be in the form of a cast sheet or another suitable form. When the scintillating material 22 is in the form of fibers, the fibers can have cross sections that are substantially rectangular, substantially round, or another shape. In another particular embodiment, an additional cladding may be used, such as a fluoropolymer. In another particular embodiment, the scintillating material 22 can include a cast sheet. The scintillating material 22 may be disposed along one side or opposite sides of the optical fibers.

In a non-limiting embodiment, the radiation detection system 20 of FIG. 2 can include a thermalyzer to convert fast neutrons into thermal neutrons, for which $^3$He, $^6$Li, and $^{10}$B have greater cross-sections. The thermalyzer can include a hydrocarbon or other thermalyzing material, such as a hydrogen-rich plastic material surrounding a portion of the radiation detection system 20, a plastic compound, another hydrocarbon compound, another material known to be an effective thermalyzer, or any combination thereof. In a particular embodiment, the polymer matrix can be a thermalyzer when the polymer matrix includes PMMA or other hydrogen-rich polymer. In another embodiment, the thermalyzer may be located at a suitable location between a radiation source (not illustrated, outside the radiation detection system 20) and the scintillation material 22.

The optical fibers include optical fibers 242, 244, and 246 and can have cross sections that are substantially rectangular (including square), substantially round, or another shape. Additional optical fibers are present within the principal sensing area but are not labeled or illustrated in FIG. 2. In an embodiment, the optical fibers may be spaced uniformly or nonuniformly within the principal sensing area 222. Optical fiber 242 is a centermost optical fiber that is disposed adjacent to the center of the principal sensing area 222. In a particular embodiment, the optical fiber 242 is the optical fiber closest to the center of the principal sensing area 222. Optical fiber 246 is an outermost optical fiber that is disposed adjacent to the perimeter of the principal sensing area 222, that is, furthest from the center of the principal sensing area 222. Optical fiber 244 is disposed between the optical fibers 242 and 246.

The optical fiber 242 does not have an S-shaped bend, and the optical fibers 244 and 246 include S-shaped bends 248. In a particular embodiment, the S-shaped bends are used to transmit light from the outer portions of the principal sensing area 222 to the photosensor modules 26 that are disposed along a center line, such as a central axis generally defined by the shapes of the photosensor modules 26. Particular embodiments described in more detail below can help to reduce photon transmission loss through the S-shaped bends 248 and provide better light collection uniformity between optical fibers, and particularly between the optical fibers 242 and 246. The composition of the optical fibers and materials adjacent to the optical fibers are discussed in more detail later in this specification.

Each photosensor module 26 can include one or more photomultiplier tubes, solid-state photomultipliers (for example, Si-photomultipliers), or the like. In a particular embodiment, only one photosensor module 26 may be used. In still another embodiment, more than two photosensor modules 26 may be used. In a particular embodiment, an optical fiber may be optically coupled to a photomultiplier tube or solid-state photomultiplier, and a different optical fiber may be optically coupled to the same or a different photomultiplier tube or solid-state photomultiplier. In a further particular embodiment, a photosensor module 26 can include photomultiplier tubes or solid-state photomultipliers organized into an array.

Figure 3:
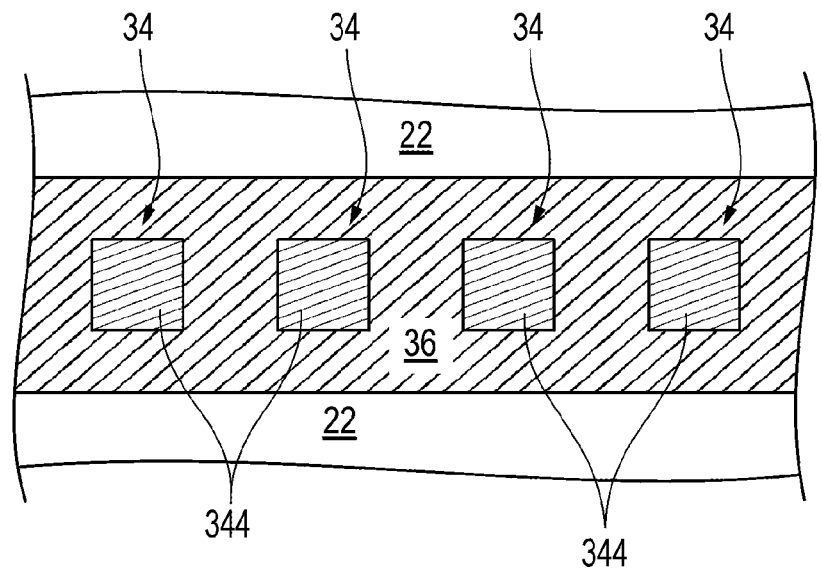
FIG. 3 includes an illustration of a cross-sectional view of a portion of a radiation detection system including optical fibers without cladding in accordance with a particular embodiment.
Figure 4:
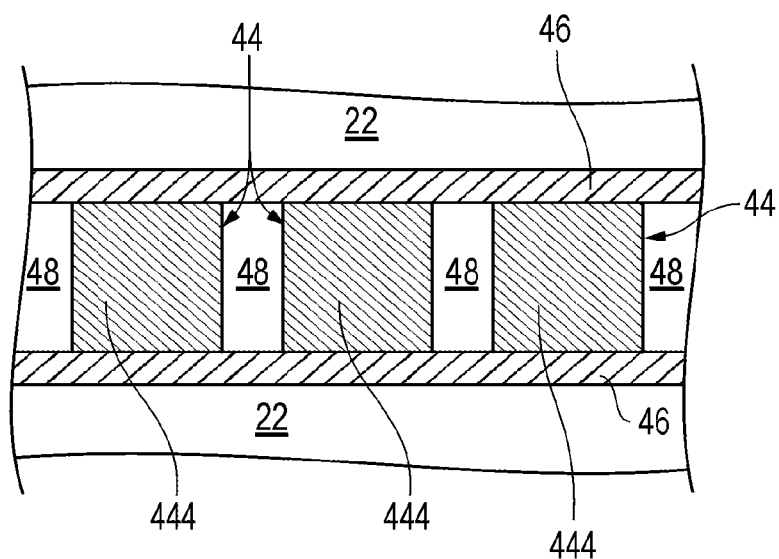
FIG. 4 includes an illustration of a cross-sectional view of a portion of a radiation detection system including optical fibers, wherein a fluid is disposed between the optical fibers in accordance with another particular embodiment.
Figure 5:
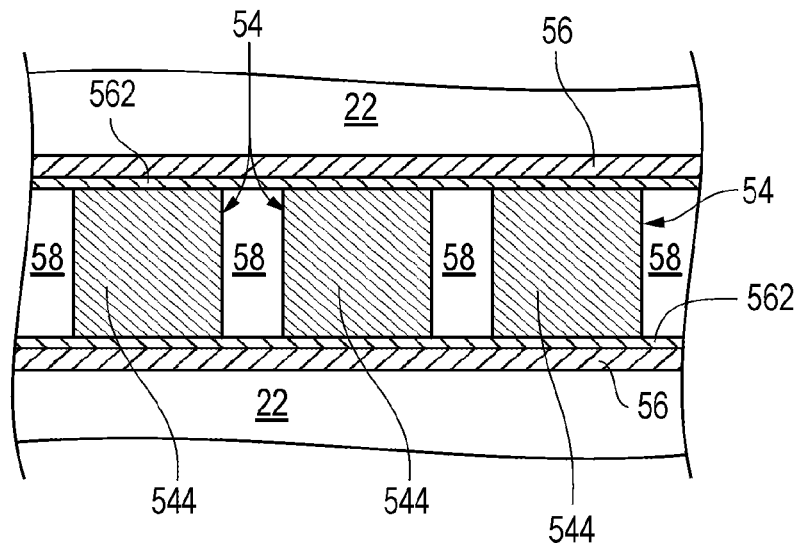
FIG. 5 includes an illustration of a cross-sectional view of a portion of a radiation detection system including optical fibers and an adhesive layer between the optical fibers and an optical coupling material in accordance with a further particular embodiment.

The geometric arrangement of the radiation detection system 20 as described with respect to FIG. 2 can be substantially the same as the geometric arrangement of the radiation detection system 10 of FIG. 1. Even with substantially the same overall geometric arrangement (for example, size of the principal sensing area, optical fibers with or without S-shaped bends, positional relationships between optical fibers and the photosensor modules, and the like), the radiation detection system 20 can have reduced photon transmission loss for S-shaped bends, improved light collection uniformity between optical fibers, and improved light collection efficiency of optical fibers, as compared to the radiation detection system 10. FIGS. 3 to 5 include different combinations of optical fibers and optical coupling materials that can improve performance of the radiation detection system 20.

FIG. 3 includes an illustration of a cross sectional view of a portion a radiation detection system including the scintillating material 22, optical fibers 34, and an optical coupling material 36 that optically couples the scintillating material 22 to the optical fibers 34. In the embodiment as illustrated, the scintillating material 22 is disposed along opposite sides of the optical coupling material 36. Each of the optical fibers 34 consists essentially of a core 344. Unlike the optical fibers 14 in FIG. 1, the optical fibers 34 do not include cladding surrounding the optical core 344. In the embodiment as illustrated, the optical coupling material 36 directly contacts the cores 344 of the optical fibers 34. In this embodiment, the optical coupling material 36 is the only material disposed between two immediately adjacent cores 344 within the principal sensing area 222. In the embodiment as illustrated, the optical coupling material 36 directly contacts the scintillating material 22.

The refractive index of the optical coupling material 36 is less than the refractive index of the cores 344. In a particular embodiment, the refractive index ($\eta$) of the optical coupling material 36 is not greater than 1.60, in another embodiment, not greater than 1.50, and in a further embodiment is not greater than 1.45. In a particular embodiment, the refractive index of the optical core is at least 1.50, in another embodiment, at least 1.55, and in a further embodiment is at least 1.60.

The optical coupling material 36 can include a silicone rubber ($\eta$=1.42) or a polymer. In a particular embodiment, the polymer can include PMMA ($\eta$=1.49) or poly(ethyl acrylate) ($\eta$=1.49). The core can include PS ($\eta$=1.60), PVT ($\eta$=1.59), or PMMA. In an embodiment using a relatively high difference between the refractive indices, the optical coupling material 36 includes a silicone rubber, and the core 344 includes PS.

FIG. 4 includes an illustration of a cross-sectional view of a portion a radiation detection system including the scintillating material 22, optical fibers 44, an optical coupling material 46, and a fluid 48 between the optical fibers 44. The composition and refractive indices for the optical fibers 44, including optical cores 444, and the optical coupling materials 46 can be any of those previously described with respect to the optical fibers 34, including optical cores 344, and the optical coupling material 36. The fluid 48 can have a refractive index that is significantly less as compared to many solids. Gases typically have lower refractive indices as compared to liquids. Many gases have a refractive index of 1.00. An exemplary gas that can be used includes air, a noble gas, $CO_2$, $N_2$, or the like. Air can include water vapor or may be substantially free of water vapor, such as clean dry air. The noble gas may be present in the fluid 48 at a concentration higher than Ar in air (0.9 volume %). In an embodiment, the noble gas may be at least 2 volume % of the fluid 48. Similarly, $CO_2$ and $N_2$ can be present at concentrations different from their respective concentrations in air (0.03 volume % for $CO_2$, and 78 volume % for $N_2$). For example, fluid 48 can include at least 0.1 volume % $CO_2$, less than 75 volume % $N_2$, or at least 80 volume % $N_2$. In a particular embodiment, the fluid 48 can include at least 10 volume %, at least 50 volume %, or at least 99 volume % of any foregoing gas or combination of such gases.

In another embodiment, more rigidity between optical fibers 44 may be needed or desired. In this embodiment, an aerogel may be used between the optical fibers 44. Aerogel includes a significant amount of entrained gas, and thus, the fluid 48 can include the entrained gas. In a particular embodiment, the aerogel can include a silica aerogel and have a refractive index in a range of 1.05 to 1.10. Compare silica aerogel to glass, which is a substantially solid material that has a refractive index of 1.46 when it consists essentially of $SiO_2$ and higher refractive indices when dopants or other impurities are added to the $SiO_2$. In still a further embodiment, the principal sensing area of the radiation detection system may be used in a high pressure environment. The fluid 48 may include a substantially incompressible fluid, such as a liquid. In an embodiment, the liquid can include water or an organic compound. In a particular embodiment, the liquid can consist essentially of water ($\eta$=1.33), such as distilled water or tap water. In another embodiment, the liquid can be an aqueous solution. An exemplary aqueous solution can include a salt or an acid (mineral or organic acid). Typically, as the concentration of the salt or acid increases, the refractive index also increases.

Some organic compounds have refractive indices below or close to the refractive index of water. In a particular embodiment, the organic compound can include fluorine or a hydroxyl group. Exemplary organic compounds can include $CF_3COOH$ ($\eta$=1.28), $CF_3CH_2OH$ ($\eta$=1.29), methanol ($\eta$=1.33), ethanol ($\eta$=1.36), another suitable organic compound, or any combination thereof.

In a further embodiment, the fluid 48 can be a non-Newtonian fluid. In an embodiment, the fluid 48 can be a gelatinous material at (1) atmospheric pressure and a temperature of approximately 20° C. or (2) the normal operating temperatures and pressures for the radiation detection system. For example, the radiation detection system may be used outdoors at a border crossing. The normal operating temperatures can be in a range of −50° C. to +70° C. and the normal operating pressure can be approximately one atmosphere.

The material and physical states of those materials within the fluid 48 may be selected such that the fluid 48 is compatible with the optical fibers 44 and the optical coupling material 46, so that the fluid 48 does not dissolve or adversely affect the optical fibers 44 or the optical coupling material 46.

After reading this specification, skilled artisans will be capable of selecting a fluid for a particular radiation detection system.

FIG. 5 includes an illustration of a cross sectional view of a portion of a radiation detection system similar to the radiation detection system as illustrated in FIG. 4. In FIG. 5, the radiation detection system includes the scintillating material 22, optical fibers 54, an optical coupling material 56, and a fluid 58 between the optical fibers 54. The composition and refractive indices for the optical fibers 54, including optical cores 544, the optical coupling materials 56, and the fluid 58 can be any of those previously described with respect to the optical fibers 34, including the optical cores 344, the optical coupling material 36, and the fluid 48. In the embodiment as illustrated in FIG. 5, the optical coupling material 56 and the optical cores 544 may not adhere or weakly adhere to each other. An adhesive layer 562 may be disposed between and contact the optical coupling material 56 and the optical cores 544 of the optical fibers 54. In an embodiment, the adhesive layer 562 has a refractive index that is about the same or less than the refractive index of the optical coupling material 56. In a particular embodiment, the adhesive layer 562 can include poly(ethyl acrylate) ($\eta=1.47$), poly(vinyl acrylate) ($\eta=1.47$), poly(vinyl butyral) ($\eta=1.49$), another suitable adhesive material, or any combination thereof. In a particular embodiment, the adhesive layer 562 can comprise CYANOCRIL™ (available from American Cyanamid), which includes poly(ethyl acrylate) or OPTICALLY CLEAR ADHESIVE 9483™, which includes an acrylic compound (available from 3M Company). An optional heat or curing operation may be performed to improve adhesion.

In another embodiment (not illustrated), the adhesive layer 562 may surround the optical cores 544 before the optical cores 544 are placed near the optical coupling material 56. In this embodiment, the adhesive layer 562 is disposed along the sides of the optical cores 544, and the fluid 58 may directly contact the optical coupling material 56 at locations spaced apart from the optical cores 544.

Figure 6:
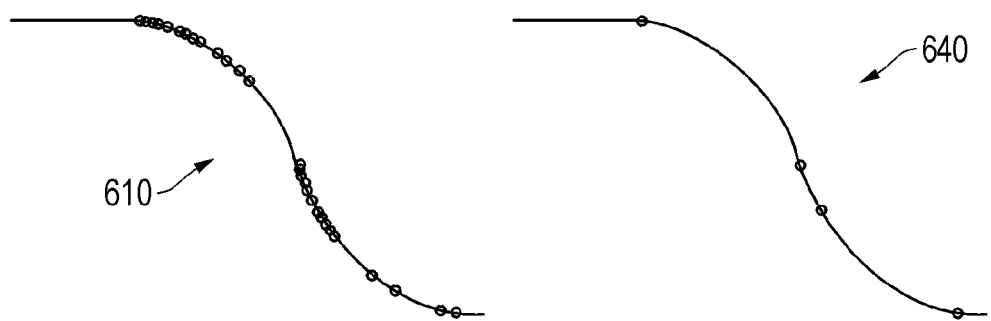
FIG. 6 includes an illustration depicting loss of photons at S-shaped bends for different radiation detection systems.

Radiation detection systems using optical fibers and optical coupling materials as described with respect to FIGS. 2 to 5 and their corresponding embodiments can exhibit improved performance. Photon transmission losses through S-shaped bends can be significantly reduced. FIG. 6 illustrates maps 610 and 640 of photons lost as light is transmitted through the S-shaped bends. The maps 610 and 640 correspond to top views of optical fibers, and thus, the scintillating material is not illustrated in the maps 610 and 640. With respect to FIG. 6, the vertical distance for the bend is measured in a top-to-bottom direction, and the lateral distance for the bend is measured in a side-to-side direction. The ratio of the vertical distance to the lateral distance, which is herein referred to as the bend ratio, is 0.8 for both maps.

The map 610 corresponds to an optical fiber/optical coupling material combination as described with respect to FIG. 1. More particularly, the optical fiber 14 is a PS core surrounded by a PMMA cladding, and the optical coupling material 16 is epoxy. Hence, the PMMA cladding and epoxy are disposed along the sides of the PS core along the S-shaped bend. Hereinafter, this combination will be referred to as the "FIG. 1 Combination." The black dots along the map 610 depict locations where photons are lost during transmission. Referring to map 610, a significant amount of photons are lost at and just after the optical fiber 14 starts the bend and at and just after the inflection point. For the fiber/optical coupling material combination as described in this paragraph, 44% of the photons entering the S-shaped bend are lost though the S-shaped bend.

Map 640 corresponds to an optical fiber/optical coupling material combination as described with respect to FIG. 4. In a particular embodiment, the optical fiber 44 has a core 444 that is PS without any cladding material, the optical coupling material 46 is silicone rubber, and the fluid 48 is air, which is adjacent to the sides of the optical fiber 44. Hence, air is disposed along the sides of the PS core along the S-shaped bend. Hereinafter, this combination will be referred to as the "FIG. 4 Combination." Referring to map 640, substantially fewer photons are lost. Only 10% of the photons entering the S-shaped bend are lost though the S-shaped bend. Although not illustrated, an optical fiber/optical coupling material combination can include a PS core and silicone rubber as illustrated with respect to FIG. 3. Hereinafter, this combination will be referred to as the "FIG. 3 Combination," and 25% of the photons entering the S-shaped bend are lost though the S-shaped bend. Thus, in an embodiment as described herein, not greater than 43% of the photons entering the S-shaped bend are lost though the S-shaped bend, and in another embodiment, not greater than 25% of the photons entering the S-shaped bend are lost though the S-shaped bend. In a particular embodiment, not greater than 10% of the photons entering the S-shaped bend are lost though the S-shaped bend.

The reduced photon transmission loss can help to improve the light collection uniformity between optical fibers. Referring to FIG. 2, the optical fiber 242 is the centermost optical fiber and does not have an S-shaped bend, and therefore, does not have photon transmission loss caused by an S-shaped bend. The optical fiber 246 is the outermost optical fiber and has the largest bend ratio for the S-shaped bend. In a particular embodiment, the bend ratio of the S-bend is 0.8. As the bend ratio increases, the photon transmission loss due to the S-shaped bend increases, and as the bend ratio decreases, the photon transmission loss, due to the shallower S-shaped bend, decreases. Thus, the optical fiber 244 has a photon transmission loss due to the S-shaped bend that is less than the optical fiber 246. Therefore, the light collection uniformity is the percentage of the light exiting the optical fiber 246 compared to the light exiting the optical fiber 242. For the purposes of comparison, the optical fibers 242 and 246 are exposed to the same light flux from the scintillating material 22. For the FIG. 1 Combination, the light collection uniformity between the optical fibers is only 76%.

In an embodiment, the light collection uniformity can be at least 77%, and in another embodiment, the light collection uniformity can be at least 90%. In a particular embodiment, the FIG. 3 Combination has a light collection uniformity of 95%, and in another particular embodiment, the FIG. 4 Combination has a light collection uniformity of 97%.

Figure 7:
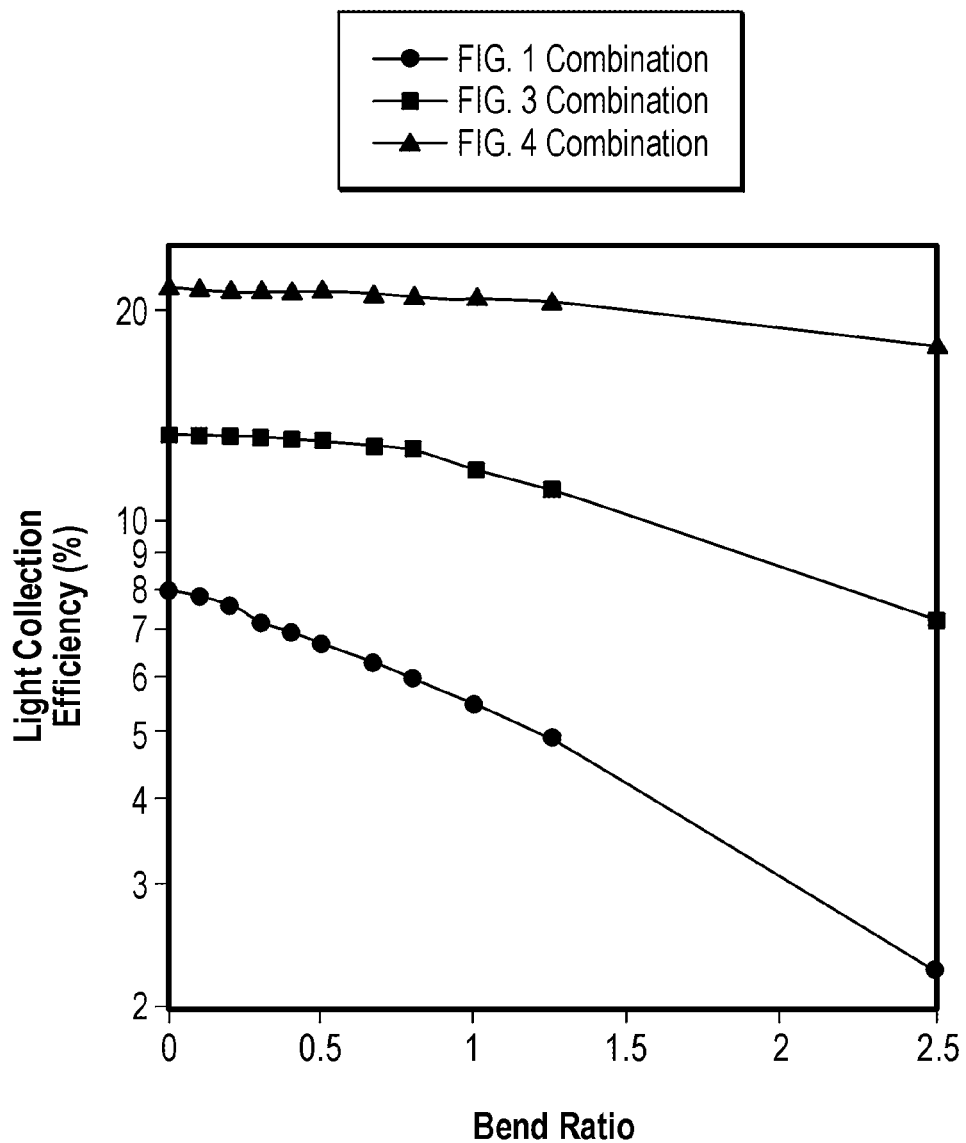
FIG. 7 includes a graph of light collection efficiency as a function of bend ratio for different radiation detection systems.

Radiation detection systems having a scintillating material and optical fibers typically have a relatively low light collection efficiency. The table below compares the light collection efficiency for optical fibers having the FIG. 1 Combination, the FIG. 3 Combination, and the FIG. 4 Combination for different bend ratios of S-shaped bends. FIG. 7 includes a graph of light collection efficiency as a function of bend ratio for the FIG. 1, FIG. 3, and FIG. 4 Combinations.

| Bend Ratio | FIG. 1 Combination | FIG. 3 Combination | FIG. 4 Combination |
|---|---|---|---|
| 10 | 0.0 | 0.0 | 7.9 |
| 5 | 0.1 | 1.7 | 11.9 |
| 2.5 | 2.3 | 7.3 | 17.9 |
| 1.25 | 4.9 | 11.1 | 20.6 |
| 1 | 5.5 | 11.8 | 20.9 |

| Bend Ratio | FIG. 1 Combination | FIG. 3 Combination | FIG. 4 Combination |
|---|---|---|---|
| 0.8 | 5.9 | 12.7 | 20.9 |
| 0.67 | 6.3 | 12.8 | 21.2 |
| 0.5 | 6.6 | 13.0 | 21.5 |
| 0.4 | 6.9 | 13.1 | 21.4 |
| 0.3 | 7.2 | 13.2 | 21.3 |
| 0.2 | 7.5 | 13.2 | 21.3 |
| 0.1 | 7.8 | 13.3 | 21.5 |
| 0 | 8.0 | 13.3 | 21.7 |

A few data points are addressed. At a bend ratio of 10, the FIG. 4 Combination has a light collection efficiency of 7.9%, whereas the FIG. 1 and FIG. 3 Combinations have no significant light collected. Thus, in a particular embodiment, at a bend ratio of 10, the light collection efficiency is greater than zero. At a vertical:lateral ratio of 0.8, the FIG. 1 Combination has a light collection efficiency of 5.9%, the FIG. 3 Combination has a light collection efficiency of 12.7%, and the FIG. 4 Combination has a light collection efficiency of 20.9%. Accordingly, in an embodiment, at a bend ratio of 0.8, the light collection efficiency is at least 6%. Even when the optical fiber has no S-shaped bend (bend ratio of 0), the FIG. 1 Combination has a light collection efficiency of only 8.0%. The FIG. 3 Combination has a light collection efficiency of 13.3%, and the FIG. 4 Combination has a light collection efficiency of 21.7%. Thus, in an embodiment, without an S-shaped bend, the light collection efficiency is at least 9%.

On a relative basis, the FIG. 3 Combination has a light efficiency that is at least 1.5 times greater than the FIG. 1 Combination, regardless of bend ratio, and has a light efficiency that is more than 2 times greater than the FIG. 1 Combination at a bend ratio of at least 0.67. The improvement with the FIG. 4 Combination is even more pronounced. The FIG. 4 Combination has a light efficiency that is at least 2.5 times greater than the FIG. 1 Combination, regardless of bend ratio, and has a light efficiency that is more than 5 times greater than the FIG. 1 Combination at a bend ratio of at least 1.25.

Radiation detection systems in accordance with embodiments described herein can have a higher signal:noise ratio. Due to less photon transmission loss through S-shaped bends, greater light collection uniformity, greater light collection efficiency, or any combination thereof, the signal:noise ratio for the radiation detector system is greater than the signal:noise ratio of a conventional radiation system having a similar overall geometry. For purposes of comparison, the two radiation detection systems are substantially identical other than optical fibers, optical coupling material, and any material between the optical fibers.

Many different test methodologies may be used to determine signal:noise ratio. The actual methodology may depend on the targeted radiation of interest, such as neutrons, gamma radiation, or another radiation source. For gamma radiation, a gamma radiation source is placed near the sensing area of a radiation detection system. The signal:noise ratio for the radiation detection system can be obtained by dividing a peak intensity, corresponding to radiation emitted by the gamma radiation source, by an intensity approximately 10 to 500 ns after the time of the peak intensity. Background noise corresponds to the intensity approximately 10 to 500 ns after the time of the peak intensity.

For neutrons, two integrated signals can used to obtain a signal:noise ratio for a radiation detection system. The first integrated signal can be obtained by integrating intensity over an energy from approximately 20 keV to at least 100 keV when a neutron radiation source is placed near the sensing area of the radiation detection system. If desired, the integration can be extended to an energy of 4.7 MeV or potentially higher; however, the value of the integrated intensity does not substantially change as the energy is increased beyond 100 keV. The second integrated signal can be obtained by integrating intensity over substantially the same energy range used for the first integrated signal; however, the second integrated signal is obtained when there is no significant neutron or gamma radiation source near the sensing area of the radiation detection system. Background noise corresponds to the second integrated signal. The signal:noise ratio can be obtained by dividing the first integrated signal by the second integrated signal.

Intensity can be measured in units of counts, bits, or another unit of measure. Energy may correspond to a bin or a channel number of a multichannel analyzer. Other methodologies to obtain signal:noise ratio for gamma radiation, neutrons, or for other targeted radiation.

When comparing two systems, the testing environments and methodologies should be substantially the same or at least as close as reasonably possible. For example, the same radiation source used should be placed substantially the same distance from the center of the sensing area of the radiation detection system when testing each radiation detection system being compared. For the gamma radiation test methodology described above, the time difference between the peak intensity and the other intensity should be approximately the same. For example, the time difference is approximately 100 ns when comparing the two systems. For the neutrons test methodology described above, the ending energy for the integrated signals for both radiation detections systems should be approximately the same. For example, the ending energy is approximately 500 keV when comparing the two systems.

A conventional radiation detection system has the FIG. 1 Combination and the novel radiation detection system has the FIG. 3 Combination, FIG. 4 Combination, an optical fiber/optical coupling combination of FIG. 5, or any other optical fiber/optical coupling combination described with respect to FIGS. 3 to 5. In a particular embodiment, the signal:noise ratio of the novel radiation detection system is at least two times greater than the signal:noise ratio of the conventional radiation detection system, and in another particular embodiment, the signal:noise ratio of the novel radiation detection system is at least three times greater than the signal:noise ratio of the conventional radiation detection system.

While the radiation detection systems described herein can be used to detect neutrons, gamma radiation, or both, the greater signal:noise ratio can be beneficial for distinguishing between neutrons and gamma radiation. Both neutrons and gamma radiation produce an intense primary peak. Other than the primary peak, gamma radiation does not have significant secondary peaks spaced apart from the primary peak, and hence, other than the primary peak, the remainder of the spectrum for the gamma radiation corresponds to noise. Unlike gamma radiation, neutrons produce secondary peaks that are spaced apart from the primary peak; however, the secondary peaks are of substantially lower intensity than primary peak. With a low signal:noise ratio, distinguishing the secondary peaks from noise may be difficult and could result in incorrect classification of radiation. For example, a neutron may be classified as gamma radiation and vice versa. When the signal:noise ratio is greater, the secondary peaks seen with neutrons will be significantly higher than peaks seen with noise. Thus, the radiation detection system may more accurately discriminate between neutrons and gamma radiation.

Although many of the embodiments have been directed to particular compositions for optical fibers (for example, cores including PS), optical coupling materials (for example, silicone rubber), and potentially a fluid (for example, air) between optical fibers, such embodiments are described to allow a better comparison to a conventional radiation detection system. Clearly, the other materials described herein can be used. For example, if the optical fibers are to shift the light to another color other than green, a different material for the optical fibers may be used. If the optical core would include polyimide ($\eta$=1.70), the signal:noise ratio may be further improved. The performance of the radiation detection system with such other materials will be different from the FIG. 3 Combination and the FIG. 4 Combination; however, many of these other radiation detection systems may have superior characteristics compared to a conventional radiation detection system.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include a scintillating material to produce a light in response to receiving a target radiation, a first optical fiber and a second optical fiber that are coupled to the scintillating material, and a fluid is disposed between the first and second optical fibers.

In an embodiment of the first aspect, the fluid includes a gas. In a particular embodiment, the fluid includes air. In a more particular embodiment, the air is substantially free of water vapor. In another particular embodiment, the fluid includes at least 2 volume % of a noble gas. In a still another particular embodiment, the fluid includes at least 0.1 volume % of $CO_2$. In yet another particular embodiment, the fluid includes less than 75 volume % or at least 80 volume % $N_2$. In a further particular embodiment, the gas is disposed within an aerogel. In a more particular embodiment, the aerogel includes a silica aerogel.

In another embodiment of the first aspect, the fluid is a substantially incompressible fluid. In still another embodiment, the fluid includes a liquid. In a particular embodiment, the liquid includes water. In another particular embodiment, the liquid includes an organic compound. In a yet another embodiment, the fluid includes a non-Newtonian fluid. In a particular embodiment, the non-Newtonian fluid includes a gelatinous material at (i) atmospheric pressure and a temperature of approximately 20° C., (ii) normal operating temperature and pressure for the radiation detection system, or both (i) and (ii).

In a further embodiment of the first aspect, the fluid has a refractive index lower than a refractive index of a core of the first or second optical fiber. In still a further embodiment, the fluid has a refractive index lower than refractive indices of cores of the first and second optical fibers. In yet a further embodiment, a core of the first or second optical fiber includes a polystyrene, a polyvinyl toluene, a polyacrylate, or any combination thereof. In another embodiment, a core of the first optical fiber and a core of the second optical fiber have substantially a same composition.

In still another embodiment of the first aspect, the first optical fiber includes an S-shaped bend. In a particular embodiment, the second optical fiber does not include an S-shaped bend. In another particular embodiment, the radiation detection system is configured such that the S-shaped bend has a bend ratio of approximately 0.8, and the first optical fiber has a photon transmission loss through the S-bend of not greater than 43%. In a more particular embodiment, the photon transmission loss is not greater than 25% or not greater than 10%.

In a further embodiment of the first aspect, the scintillating material, the first and second fibers, and the fluid are disposed within a principal sensing area of the radiation detection system. In a particular embodiment, the first optical fiber is an outermost optical fiber disposed adjacent to a perimeter of the principal sensing area, the second optical fiber is a centermost optical fiber disposed adjacent to a center of the principal sensing area, and light collection uniformity between the first and second optical fibers is at least 77%. In a more particular embodiment, the light collection uniformity is at least 90% or at least 95%.

In another particular embodiment of the first aspect, the radiation detection system has a first signal:noise ratio. A different radiation detection systems is substantially identical to the radiation system, except that the different radiation detection system includes optical fibers and epoxy as an only material disposed between and in direct contact with the optical fibers within a principal sensing area of the different radiation detection system, wherein each optical fiber consists of a polystyrene core and a poly(methyl methacrylate) cladding surrounding the polystyrene core. The different radiation detection system has a second signal:noise ratio less than the first signal:noise ratio. In an even more particular embodiment, the first signal:noise ratio is at least two times greater than the second signal:noise ratio or at least three times greater than the second signal:noise ratio.

In yet a further embodiment of the first aspect, the radiation detection system further includes an optical coupling material disposed between the scintillating material and the first or second optical fiber. In a particular embodiment, the optical coupling material directly contacts a core of the first or second optical fiber. In another particular embodiment, the radiation detection system further includes an adhesive material, wherein the adhesive material is disposed between and in direct contact with the optical coupling material and a core of the first or second optical fiber. In still another particular embodiment, the optical coupling material has a refractive index that is less than a refractive index of a core of the first or second optical fiber. In a more particular embodiment, the optical coupling material includes silicone rubber. In another more particular embodiment, the optical coupling material includes a polymer. In an even more particular embodiment, the polymer includes a polyacrylate, a poly(vinyl toluene), or any combination thereof.

In still a further embodiment of the first aspect, the target radiation includes neutrons, gamma radiation, or any combination thereof. In yet a further embodiment, the radiation detection system further includes a photosensor module optically coupled to ends of the first and second optical fibers. In a particular embodiment, the photosensor module includes a photomultiplier tube or a solid-state photomultiplier. In another particular embodiment, the photosensor module includes a first photosensor component coupled to the first optical fiber and a second photosensor component coupled to the second optical fiber.

In a second aspect, a radiation detection system can include a scintillating material to produce a light in response to receiving a target radiation, a first optical fiber and a second optical fiber, and an optical coupling material disposed between the first and second optical fibers, wherein the optical coupling material has a refractive index less than 1.50.

In an embodiment of the second aspect, the optical coupling material is in direct contact with cores of the first and second optical fibers. In another embodiment, an adhesive layer is disposed between the optical coupling material and a core of the first or second optical fiber. In a particular embodiment, the adhesive layer has a refractive index less than the core of the first or second optical fiber. In another particular embodiment, the adhesive layer includes a poly(vinyl alcohol), a polyacrylate, a poly(vinyl butyral), or any combination thereof. In still another embodiment, the optical coupling material includes a polymer. In a more particular embodiment, the polymer includes a polyacrylate. In yet another embodiment, the optical coupling material includes an aerogel. In a particular embodiment, the optical coupling material includes a silica aerogel.

In a further embodiment of the second aspect, a core of the first or second optical fiber includes a polystyrene, a poly(vinyl toluene), a polyacrylate, or any combination thereof. In still a further embodiment, the optical coupling material is disposed between the scintillating material and each of the first and second optical fibers. In another embodiment, the first and second optical fibers have substantially a same composition. In a still another embodiment, the first optical fiber includes an S-shaped bend. In a particular embodiment, the second optical fiber does not include an S-shaped bend. In another particular embodiment, the radiation detection system is configured such that the S-shaped bend has a bend ratio of approximately 0.8, and the first optical fiber has a photon transmission loss through the S-bend of not greater than 43%. In a more particular embodiment, the photon transmission loss is not greater than 25% or not greater than 10%. In yet another embodiment, the first optical fiber is an outermost optical fiber disposed adjacent to a perimeter of a principal sensing area, the second optical fiber is a centermost optical fiber disposed adjacent to a center of the principal sensing area, and a light collection uniformity between the first and second optical fibers is at least 77%. In a particular embodiment, the light collection uniformity is at least 90% or at least 95%.

In a further embodiment of the second aspect, the radiation detection system has a first signal:noise ratio. A different radiation detection systems is substantially identical to the radiation system, except that the different radiation detection system includes optical fibers and epoxy as an only material disposed between and in direct contact with the optical fibers within a principal sensing area of the different radiation detection system, wherein each optical fiber consists of a polystyrene core and a poly(methyl methacrylate) cladding surrounding the polystyrene core. The different radiation detection system has a second signal:noise ratio less than the first signal:noise ratio. In a particular embodiment, the first signal:noise ratio is at least two times greater than the second signal:noise ratio or at least three times greater than the second signal:noise ratio. In still a further embodiment, the optical coupling material is disposed between the scintillating material and the first or second optical fiber. In yet a further embodiment, the optical coupling material includes silicone rubber. In a particular embodiment, the optical coupling material includes a polymer. In a more particular embodiment, the polymer includes a polyacrylate.

In another embodiment of the second aspect, the radiation detection system further includes a photosensor module optically coupled to ends of the first and second optical fibers. In a particular embodiment, the photosensor module includes a photomultiplier tube or a solid-state photomultiplier. In another particular embodiment, the photosensor module includes a first photosensor component coupled to the first optical fiber and a second photosensor component coupled to the second optical fiber. In still another embodiment, the optical coupling material has a refractive index not greater than 1.45, or another material is disposed between first and second optical fibers and has a refractive index not greater than 1.45. In a further embodiment, the optical coupling material has a refractive index not greater than 1.40, or another material is disposed between first and second optical fibers and has a refractive index not greater than 1.40. In still a further embodiment, the optical coupling material has a refractive index not greater than 1.25, or another material is disposed between first and second optical fibers and has a refractive index not greater than 1.25.

In a third aspect, a radiation detection system can include a scintillating material to produce a light in response to receiving a target radiation, optical fibers, and an optical coupling material disposed between scintillating material and the optical fibers. The radiation detection system can have a first signal:noise ratio. A different radiation detection systems is substantially identical to the radiation system, except that the different radiation detection system includes optical fibers and epoxy as an only material disposed between and in direct contact with the optical fibers within a principal sensing area of the different radiation detection system, wherein each optical fiber consists of a polystyrene core and a poly(methyl methacrylate) cladding surrounding the polystyrene core. The different radiation detection system can have a second signal:noise ratio less than the first signal:noise ratio.

In an embodiment of the third aspect, the first signal:noise ratio is at least two times greater than the second signal:noise ratio or at least three times greater than the second signal:noise ratio. In another embodiment, the target radiation includes neutrons, gamma radiation, or any combination thereof. In still another embodiment, the radiation detection system further includes a photosensor module optically coupled to ends of the first and second optical fibers. In a particular embodiment, the photosensor module includes a photomultiplier tube or a solid-state photomultiplier. In another particular embodiment, the photosensor module includes a first photosensor component coupled to the first optical fiber and a second photosensor component coupled to the second optical fiber.

In a fourth aspect, a radiation detection system can include a scintillating material to produce a light in response to receiving a target radiation, an optical fiber, and an optical coupling material disposed between scintillating material and the optical fiber. The optical fiber may not have an S-shaped bend and has a light collection efficiency of at least 9%, the optical fiber can have an S-shaped bend has a bend ratio of 0.8 and a light collection efficiency of at least 6%, or the optical fiber has an S-shaped bend can have a bend ratio of 10 and a light collection efficiency greater than zero.

In an embodiment of the fourth aspect, the target radiation includes neutrons, gamma radiation, or any combination thereof. In another embodiment, the radiation detection system further includes a photosensor module optically coupled to end of the optical fiber. In a particular embodiment, the photosensor module includes a photomultiplier tube or a solid-state photomultiplier.

In a fifth aspect, a method of using a radiation detection system can include placing a radiation source near the radiation detection system can include a scintillating material, a first optical fiber and a second optical fiber that are coupled to the scintillating material, wherein the first optical fiber is an outermost optical fiber disposed adjacent to a perimeter of the principal sensing area, and the second optical fiber is a centermost optical fiber disposed adjacent to a center of the principal sensing area. The method can also include generating a first light within the scintillating material and receiving at the first and second optical fibers first light from the scintillating material. The method can further include transmitting a second light to ends of the first and second optical fibers, wherein at substantially a same light flux of the first light received at the first and second optical fibers, a light intensity at the end of the first optical fiber is at least 77% of a light intensity at the end of the second optical fiber.

In an embodiment of the fifth aspect, the light intensity at the end of the first optical fiber is at least 90% of the light intensity at the end of the second optical fiber. In another embodiment, the light intensity at the end of the first optical fiber is at least 95% of the light intensity at the end of the second optical fiber. In still another embodiment, the first optical fiber has an S-shaped bend. In a particular embodiment, the second optical fiber does not have an S-bend. In another particular embodiment, the S-shaped bend has a bend ratio of approximately 0.8, and not greater than 43% of photons entering the S-shaped bend are lost during transmission through the S-bend. In a more particular embodiment, not greater than 25% of photons entering the S-shaped bend are lost during transmission through the S-bend. In another more particular embodiment, not greater than 10% of photons entering the S-shaped bend are lost during transmission through the S-bend.

In yet another embodiment of the fifth aspect, the target radiation includes neutrons, gamma radiation, or any combination thereof. In a further embodiment, the radiation detection system further includes a photosensor module optically coupled to the ends of the first and second optical fibers. In a particular embodiment, the photosensor module includes a photomultiplier tube or a solid-state photomultiplier. In another particular embodiment, the photosensor module includes a first photosensor component coupled to the first optical fiber and a second photosensor component coupled to the second optical fiber.

In a sixth aspect, a method of using a radiation detection system can include placing a radiation source near the radiation detection system including a scintillating material, and an optical fiber having an S-shaped bend that has a bend ratio of approximately 0.8. The method can also include generating light within the scintillating material and receiving at the optical fiber light from the scintillating material. The method can further include transmitting the light through the S-shaped bend of the first optical fiber, wherein not greater than 43% of photons entering the S-shaped bend are lost during transmission through the S-bend.

In an embodiment of the sixth aspect, not greater than 25% of photons entering the S-shaped bend are lost during transmission through the S-bend. In another embodiment, not greater than 10% of photons entering the S-shaped bend are lost during transmission through the S-bend. In still another embodiment, the target radiation includes neutrons, gamma radiation, or any combination thereof. In a further embodiment, the radiation detection system further includes a photosensor module optically coupled to an end of the optical fiber. In a particular embodiment, the photosensor module includes a photomultiplier tube or a solid state photomultiplier.

Note that not all of the activities described above in the general description or the examples are required, that a portion of a specific activity may not be required, and that one or more further activities may be performed in addition to those described. Still further, the order in which activities are listed is not necessarily the order in which they are performed.

In a particular embodiment, a method may be described in a series of sequential actions. The sequence of the actions and the party performing the actions may be changed without necessarily departing from the scope of the teachings unless explicitly stated to the contrary. Actions may be added, deleted, or altered. Also, a particular action may be iterated. Further, actions within a method that are disclosed as being performed in parallel may in particular cases be performed serially, and other actions within a method that are disclosed as being performed serially may in particular cases be performed in parallel.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
a first scintillating material to produce a light in response to receiving a target radiation;
a first optical fiber and a second optical fiber that are coupled to the first scintillating material;
a first optical coupling material; and
a fluid,
wherein, from a cross-sectional view:
the first optical coupling material is disposed along first sides of the first and second optical fibers; and
the fluid is disposed between and along second sides of the first and second optical fibers.

2. The radiation detection system of claim 1, further comprising:
a second scintillating material; and
a second optical coupling material,
wherein from the cross-sectional view,
the second optical coupling material is disposed along third sides of the first and second optical fibers;
for each of the first and second optical fibers, the first side is opposite the third side; and
the fluid is disposed between the first and second optical coupling materials.

3. The radiation detection system of claim 2, further comprising a third optical fiber, wherein from the cross-sectional view:

the first optical coupling material is disposed along third sides of the first and second optical fibers;

for each of the first and second optical fibers, the first side is opposite the third side; and the fluid is disposed between the second and third optical fibers.

4. The radiation detection system of claim 3, wherein:

the first, second and third fibers, and the fluid are disposed within a principal sensing area of the radiation detection system;

the first optical fiber is an outermost optical fiber disposed adjacent to a perimeter of the principal sensing area;

the third optical fiber is a centermost optical fiber disposed adjacent to a center of the principal sensing area; and a light collection uniformity between the first and third optical fibers is at least 77%.

5. The radiation detection system of claim 4, wherein the light collection uniformity is at least 90%.

6. The radiation detection system of claim 2, wherein:

the first and second scintillating materials are a same scintillating material; and the first and second optical coupling materials are a same optical coupling material.

7. The radiation detection system of claim 1, wherein the fluid includes a gas.

8. The radiation detection system of claim 7, wherein the gas is disposed within an aerogel.

9. The radiation detection system of claim 1, wherein the fluid includes a liquid.

10. The radiation detection system of claim 1, wherein the first optical fiber includes an S-shaped bend.

11. The radiation detection system of claim 10, further comprising a third optical fiber that does not include an S-shaped bend.

12. The radiation detection system of claim 10, wherein:

the radiation detection system is configured such that the S-shaped bend has a bend ratio of approximately 0.8;

the first optical fiber has a photon transmission loss through the S-bend of not greater than 43%; and the third optical fiber has a lower photon transmission loss as compared to the first optical fiber.

13. The radiation detection system of claim 12, wherein the photon transmission loss of the first optical fiber is not greater than 25%.

14. The radiation detection system of claim 12, wherein the photon transmission loss of the first optical fiber is not greater than 10%.

15. A radiation detection system comprising:

a first scintillating material;

a second scintillating material;

a first optical fiber;

a first optical coupling material;

a second optical coupling material; and a fluid, wherein, from a cross-sectional view:

the first and second optical coupling materials are disposed at opposite points along the first optical fiber;

the first optical coupling material is disposed between the first scintillating material and the first optical fiber;

the second optical coupling material is disposed between the second scintillating material and the first optical fiber; and the fluid is disposed at another point along the first optical fiber and between the first and second optical coupling materials.

16. The radiation detection system of claim 15, further comprising a second optical fiber, wherein, from the cross-sectional view:

the first and second optical coupling materials are disposed at opposite points along the second optical fiber;

the first optical coupling material is disposed between the first scintillating material and the second optical fiber; and the second optical coupling material is disposed between the second scintillating material and the second optical fiber.

17. The radiation detection system of claim 16, wherein:

the first optical fiber includes an S-shaped bend; and the second optical fiber does not include an S-shaped bend.

18. The radiation detection system of claim 16, wherein the first and second optical coupling materials are in direct contact with cores of the first and second optical fibers.

19. The radiation detection system of claim 15, wherein an adhesive layer is disposed between the first optical coupling material and a core of the first or second optical fiber.

20. The radiation detection system of claim 15, further comprising a photosensor module optically coupled to ends of the first and second optical fibers.

\* \* \* \* \*